United States Patent
Heikkila et al.

(12) 
(10) Patent No.: US 9,109,265 B2
(45) Date of Patent: Aug. 18, 2015

(54) PROCESS FOR SEPARATION OF CA- OR MG-SULFITE SPENT LIQUOR TO YIELD CRYSTALLINE XYLOSE

(75) Inventors: Heikki Heikkila, Espoo (FI); Jari Lewandowski, Siuntio (FI)

(73) Assignee: DUPONT NUTRITION BIOSCIENCES APS (DK)

( * ) Notice: Subject to any disclaimer, the term of this patent is extended or adjusted under 35 U.S.C. 154(b) by 787 days.

(21) Appl. No.: 13/001,267

(22) PCT Filed: Jun. 26, 2008

(86) PCT No.: PCT/EP2008/058172
§ 371 (c)(1),
(2), (4) Date: Dec. 23, 2010

(87) PCT Pub. No.: WO2009/155982
PCT Pub. Date: Dec. 30, 2009

(65) Prior Publication Data
US 2011/0172411 A1     Jul. 14, 2011

(51) Int. Cl.
| | | |
|---|---|---|
| *B01D 15/36* | (2006.01) | |
| *C13K 13/00* | (2006.01) | |
| *C08H 7/00* | (2011.01) | |
| *C13B 20/14* | (2011.01) | |
| *C13B 35/06* | (2011.01) | |

(52) U.S. Cl.
CPC ............ *C13K 13/002* (2013.01); *B01D 15/362* (2013.01); *C08H 6/00* (2013.01); *C13B 20/144* (2013.01); *C13B 35/06* (2013.01)

(58) Field of Classification Search
CPC ...... B01D 15/362; C08H 6/00; C13K 13/002; C13B 35/06; C13B 20/144
USPC ...................... 210/635, 638, 656, 659, 198.2; 127/46.2
See application file for complete search history.

(56) References Cited

U.S. PATENT DOCUMENTS

| | | | |
|---|---|---|---|
| 4,008,285 A | | 2/1977 | Melaja et al. |
| 4,631,129 A * | | 12/1986 | Heikkila ..................... 210/635 |
| 5,637,225 A | | 6/1997 | Heikkila et al. |
| 5,730,877 A * | | 3/1998 | Heikkila et al. ............. 210/659 |
| 6,086,681 A * | | 7/2000 | Lindroos et al. ................ 127/37 |
| 6,239,274 B1 * | | 5/2001 | Heikkila et al. ............. 536/128 |
| 6,280,623 B1 * | | 8/2001 | Ma ................. 210/264 |
| 6,987,183 B2 | | 1/2006 | Heikkila et al. |
| 7,022,239 B2 * | | 4/2006 | Heikkila et al. ............. 210/659 |
| 2003/0094416 A1 * | | 5/2003 | Heikkila et al. ............. 210/659 |
| 2003/0217970 A1 * | | 11/2003 | Heikkila et al. ............. 210/635 |
| 2011/0172411 A1 * | | 7/2011 | Heikkila et al. ............. 536/127 |

FOREIGN PATENT DOCUMENTS

| | | |
|---|---|---|
| EP | 1 333 103 A1 | 8/2003 |
| WO | WO 97/49659 | 12/1997 |
| WO | WO 99/34021 | 7/1999 |
| WO | WO 02/22228 A2 | 3/2002 |

OTHER PUBLICATIONS

International Search Report dated Apr. 21, 2009.

* cited by examiner

*Primary Examiner* — Ernest G Therkorn

(57) ABSTRACT

A process for the separation of a xylose-containing, lignosulphonate-containing Ca-sulfite spent liquor is provided. The process comprises a first step of: (A) chromatographic separation of the Ca- or Mg-sulfite spent liquor using a single pass through a batch-type long resin bed chromatography column having a strong acid cation exchange resin as a separation medium. The ratio of the bed length:mean resin bead diameter of the column is 10,000-40,000. This step yields •a first xylose-rich fraction having a xylose content 50-70 wt. % based on dry solids and • a lignosulphonate-rich fraction. The process further comprises a step of: (B) crystallizing xylose from the first xylose rich fraction by using a crystallization method comprising (i) boiling crystallization; (ii) cooling crystallization or (iii) a combination of (i) and (ii) to obtain a first batch of crystalline xylose and a first xylose run-off. The process provides a simplification of existing methods, and at the same time allows advantages such as improved xylose yield and improved xylose purity.

26 Claims, No Drawings

PROCESS FOR SEPARATION OF CA- OR MG-SULFITE SPENT LIQUOR TO YIELD CRYSTALLINE XYLOSE

REFERENCE TO RELATED APPLICATIONS

This application is a 371 of PCT/EP08/58172 filed Jun. 26, 2008

TECHNICAL FIELD

The present invention relates to the field of chemical processing of sugar-containing solutions, in particular by chromatographic separation processes. Specifically, the present invention provides a process for the separation of a xylose-containing, lignosulphonate-containing Ca- or Mg-sulfite spent liquor by chromatographic separation using a batch-type long resin bed chromatography column. The process according to the present invention may lead to an improved xylose yield, increased xylose content of the xylose-containing fraction and increased chromatography column capacity, and at the same time provides a simplification of currently used separation methods. A total process for producing crystalline xylose from sulfite spent liquor is provided, which uses simplified batch separation and efficient crystallization.

BACKGROUND

Sulfite spent liquors are produced as a byproduct in the production of wood pulp via the well-known sulfite process. Sulfite spent liquors comprise undissolved wood solids, lignosulphonates, hydroxy acids as aldonic acids and hexose and pentose sugars, as well as various cooking chemicals introduced in the pulping process. In the past, these liquors were either concentrated, dried or desugarized to be used as lignosulphonate products for example in feeds or discarded, e.g. by discharging these into the environment or by drying the liquor and burning the remaining material and recovering cooking chemicals. Both of these practices for disposal of the sulfite spent liquors have environmental disadvantages, as these tend to pollute the environment with potentially damaging chemicals such as sulfur compounds, the sulfite spent liquor generally having a high sulfur content. Accordingly, there has in past been much focus on disposal of these liquors in an improved manner.

A key development in the disposal of sulfite spent liquors was the realization that the liquors, generally considered to be an invaluable product, include commercially valuable components including xylose. Xylose is an aldopentose, a monosaccharide containing five carbon atoms and including an aldehyde functional group. It has the chemical formula $C_5H_{10}O_5$.

Xylose is particularly valuable because it can easily be converted into xylitol, a five-carbon sugar alcohol which has applications as a sugar substitute. Xylitol is roughly as sweet as sucrose, but has a caloric value of 2.4 kcal/g compared to the value of sucrose, 4 kcal/g. Furthermore, xylitol contains no net effective carbohydrates, whereas sucrose contains 4 grams carbohydrate per teaspoon. Furthermore, xylitol has virtually no aftertaste, and is generally considered to be safe for diabetics and individuals with hyperglycaemia, because sugar-alcohols have less impact on a person's blood sugar than regular sugars. The use of xylitol as a sweetener is considered advantageous because xylitol is a "tooth friendly" sugar; in addition to not encouraging tooth decay in the same way as sucrose and glucose, xylitol actively aids repair of minor cavities caused by dental caries.

For the above reasons, xylitol is a commercially valuable sugar which is finding increasingly many applications in the manufacture of e.g. foodstuffs and sweets. As xylitol can easily be prepared from xylose, there is a great interest in finding ways to extract xylose from sulfite spent liquors in the most efficient manner possible. Accordingly, scientists have for several years been trying to find the best possible separation process whereby xylose can be isolated in high purity and high yield, in a manner which is fast, efficient, convenient and cheap.

THE PRIOR ART

The current benchmark for extracting xylose from a sulfite spent liquor is the process disclosed in U.S. Pat. No. 4,631,129. This process includes as its key steps:
(a) introducing sulfite spent liquor at low pH into a chromatographic column and eluting the liquor with water to recover (i) a lignosulfonate-rich fraction and (ii) a sugar-rich fraction;
(b) collecting the sugar-rich fraction and increasing its pH;
(c) introducing the high-pH sugar-rich fraction into a second chromatographic column; and
(d) eluting the sugar-rich material from the second column with water to yield a second sugar-rich fraction and a second lignosulfonate-rich fraction.

Although the above process has generally been commercially successful, there is still room for improvement in so far as the yield and purity of the sugar fraction could be improved, whilst the process technology might also be simplified to save costs and facilitate the separation process.

According to U.S. Pat. No. 6,987,183, xylose is separated from a xylose crystallization run-off (xylose content: 26% by weight based on dry solids) originating from spent liquor raw material, subjecting it to chromatographic separation using a strongly acid cation (SAC) exchange resin in Na-form having the following characteristics: Resin crosslinking: 5.5 wt. % DVB; average resin bead diameter: 0.41 mm; column diameter: 0.225 m; and column height: 5.1 m. The separated xylose fraction had a xylose content 37.7% on dry solids and the yield of xylose based on the xylose in the feed was 99%.

It is desired to have a xylose separation process which allows better separation of xylose and in particular allows a higher xylose content to be achieved after a first separation step. In particular, it would be desirable to have a separation process which allows the generation of a xylose fraction having a purity high enough to be crystallized without the need for further processing. This would allow a simplification of the known separation processes.

The afore-mentioned bed length:mean resin bead size diameter ratio is unitless because both measurements are length measurements. Conveniently, both the bed length and the mean resin bead size diameter can be measured in millimeters.

The bed length can be measured using a measuring tape. The mean resin bead size diameter is measured for example by a size distribution analyser Pamas DPFS (Pamas Gmbh).

BRIEF DESCRIPTION OF THE PRESENT INVENTION

The present invention relates to a process for the separation of a xylose-containing, lignosulphonate-containing Ca- or Mg-sulfite spent liquor having a xylose content of 14-27 wt. % based on dry solids, the process comprising:
(A) carrying out chromatographic separation of the Ca- or Mg-sulfite spent liquor using a single pass through a batch-type long resin bed chromatography column having a strong acid cation exchange resin as a separation medium, the ratio of the bed length:mean resin bead diameter of the column being 10,000-40,000 to obtain a first xylose-rich fraction having a xylose content 50-70 wt. % based on dry solids and a lignosulphonate-rich fraction, and (B) crystallizing xylose from the first xylose rich fraction by using a crystallization method comprising (i) boiling crystallization; (ii) cooling crystallization or (iii) a combination of (i) and (ii) to obtain a first batch of crystalline xylose and a first xylose run-off.

Preferred embodiments of this method are set out in the claims appended hereto.

DETAILED DESCRIPTION

Although those skilled in the art were of the belief that the best way to carry out commercial xylose isolation by chromatography was using two chromatographic columns (or by using multiple passes of solute through the same column), the present inventors have surprisingly found that it is in fact possible to simplify the known two-column technique by using just a single pass through one column.

The present inventors have surprisingly discovered that with just one pass through a chromatographic column of having a bed length:mean resin bead diameter of 10000-40000, and preferably 15000-25000, separation of xylose from a Ca- or Mg-sulfite spent liquor does result in a high xylose yield, a high xylose content without causing a significant reduction in separation capacity, and indeed allows an increase in separation capacity. This most surprising finding underlies the present invention.

The process of the present invention is carried out on a feed which is a xylose-containing, lignosulphonate-containing Ca- or Mg-sulfite spent liquor. The xylose content of the feed is 14-27 wt. % based on dry solids.

One step of the present process involves the chromatographic separation of the Ca-sulfite or Mg-sulfite spent liquor using a batch-type long resin bed chromatography column having the ratio of the bed length to mean bead size of resin between 10000-25000 to obtain (i) a first xylose-rich fraction and (ii) a lignosulphonate-rich fraction.

In this key step, the sulfite spent liquor is usually a byproduct from the production of wood pulps via the sulfite process. The sulfite spent liquor may comprise undissolved wood solids, lignosulphonates, hydroxyl acids as aldonic acids, hexoses and pentoses and other chemicals. The liquor comprises xylose and lignosulphonate. Preferably, the liquor is derived from the sulfite cooking of hardwood as birch wood.

The batch-type long resin bed chromatography columns generally commercially used are constructed of steel. The column preferably has a length in the range 5-19 meters; preferred sub-ranges include 7-10 meters and 8-9 meters. The columns with the height 12-19 meters may be arranged by having two columns in a row and transfer of the liquid from a column to the other is performed without mixing the formed separation profile and without taking any product fractions out from the first column. Special distribution and collecting devices or perforated plates can be used to transfer the liquid with its separation profile from a column to the other. The diameter of the column is not particularly limited, but is preferably in the range 5 cm-4 meters. Where the separation is carried out at lab scale or pilot scale, suitable column diameters may be in the range 5-50 cm, preferably 10-30 cm and more preferably 10-20 cm. Where larger scale separation is desired, suitable column diameters may be in the range 1-5 meters, preferably 2-4 meters and more preferably 2.5-3.5 meters.

The chromatographic column may be packed with a strong acid cation exchange resin in the $Ca^{2+}$ form. Normally the cation form of the resin corresponds to the cation of the feed liquid. A preferred resin is a sulphonated polystyrene divinyl benzene resin. The resin preferably has a divinyl benzene content in the range 1-10%, more preferably 2-8%, and most preferably 3-7%. The mean bead diameter of the resin may be in the range 0.10-1.00 mm, and is more preferably in the range 0.25-0.5 mm, and most preferably in the range 0.32-0.42 mm. The mean bead diameter is measured by the techniques mentioned above.

Prior to the carrying out of the chromatographic separation step (A), the Ca-sulfite or Mg-sulfite spent liquor may optionally be filtered in order to remove or reduce the content of suspended solids to the level less than 0.2% by weight based on the weight of the whole liquor. Such a step is particularly preferably included where the content of undissolved wood solids in the liquor is high, i.e. when the solid content of these undissolved components is greater than 1 wt. %, (on the weight of the whole liquor). This optional filtration step may e.g. be conducted using a pressure filter or by other conventional filtration techniques using filtering aid like diathomous earth. Where a filtration step is included, the properties of the liquor as defined in this application relate to the filtered liquor.

Furthermore, prior to the separation step (A) it may be desirable to alter the dry solids content of the liquor, e.g. by diluting the liquor with water or by removing water to further concentrate the liquor. Preferably, the liquor has a dry weight content of 20-55 grams per 100 grams of liquor, more preferably 25-45 grams per 100 grams of liquor. Where a step of altering the dry solids content (DS) of the liquor is included, the properties of the liquor as defined in this application relate to the liquor after this treatment.

Furthermore, the xylose content of the liquor may be adjusted prior to the separation by adding a xylose-rich component or mother liquor to the liquor. The xylose content of the liquor (based on dry solid contents) prior to chromatographic treatment is 14-27 wt. % preferably 17-27 wt. % on the dry solids content. Where a step of altering the xylose content of the liquor is included, the properties of the liquor as defined in this application relate to the liquor after this treatment.

When the feed liquor is introduced into the chromatographic column, this is done in a batch-wise manner. The rate (m/h, linear flow) at which the liquor is introduced into the column depends crucially on the length and diameter of the column. A practical feed rate is 0.5-5 m/h as a linear flow rate and more preferably 1-2.5 m/h.

The feed volume is 5-20% of the volume of the resin bed in the column and more preferably 12-13% of the volume of the resin bed in the column. The dry solids content in the feed is preferably 20-55 wt. %, more preferably 25-35 wt. %.

The temperature of the liquor at the time of introduction into the column is not particularly limited; it is however preferred that the liquor is at a temperature of 20-95° C., more preferably in the range 55-90° C., and most preferably in the range 60-70° C.

According to the present process, there is no particular need to adjust the pH of the liquor prior to chromatographic separation. It is though preferable for the liquor to have a pH value in the range of 1-5, more preferably 2-4 and most preferable 2.5-3.5, and an optional pH adjusting step may be included if desired.

Following introduction of the liquor into the column, an eluent is introduced. The eluent used is preferably water. The eluent is preferably introduced at a temperature which corresponds to that of the liquor. The same ranges as set out above in connection with the liquor equally apply to the eluent. The amount of eluent which is preferably used depends on the amount of liquor introduced and on the targeted overlapping of the separation profiles in the outflow; the preferred eluent: feed liquor ratio is in the range 2-5 (wherein these values correspond to volume ratios).

After equilibration of the system, a first xylose-rich fraction and a lignosulphonate-rich fraction can be collected from the column. The first xylose-rich fraction preferably has 50-70 wt. % xylose based on the dry solid contents; more preferably the xylose content is 58-67 wt. % based on dry solids, e.g. when the feed liquor used has a xylose content of 17-27 wt, % based on dry solids. The separation procedure preferably allows a xylose yield (calculated from the out taken product fraction(s) and residual fraction(s)) of more than 90 wt. %, more preferably more than 93 wt. % and most preferably more than 96 wt. % to be obtained in the xylose-rich fraction (relative to the weight of xylose present in the feed liquor). Recycle fractions, which may be taken before and after the product fraction, are reused by mixing them with the spent liquor before feeding. In a preferred separation procedure a xylose rich fraction with a xylose content 59-67% on dry solids (on DS) is achieved with xylose yield 94-97%.

Ideally, the content of $Ca^{2+}$ in the first xylose-rich fraction is as low as possible; preferably, the content is 0.5-1 wt. %, more preferably 0.5-0.8 wt. % based on dry solids.

In a preferred embodiment, the Ca-content of the first xylose-rich fraction from Ca-spent liquor is reduced to below 200 ppm, and preferably below 100 ppm (based on dry solid contents). Such a step is particularly preferable before evaporation to avoid Ca-precipitation where $Ca^{2+}$ is present. Preferably, the Ca-content of the first xylose-rich fraction is reduced either by use of an ion exchanger or by use of nanofiltration where $Ca^{2+}$ is present in the feed.

A further step to be carried out after chromatographic separation is the concentration of the xylose-rich fraction preferably by evaporation, in order to increase the dry solids and xylose content of the first xylose-rich fraction thereby obtaining a first concentrated xylose-rich solution. This solution preferably has a dry solids content of more than 60 wt. %, preferably more than 65 wt. % and most preferably more than 70 wt. %.

In addition to the afore-mentioned step (A), a second essential step of the present process is the crystallization step (B) in which xylose is crystallized from the first xylose-rich fraction. This is conducted using cooling crystallization, boiling crystallization or a combination of these crystallization techniques. The result of such crystallization is the recovery of a first xylose run-off and a first batch of crystalline xylose.

In a preferred embodiment, the xylose rich fraction subjected to crystallization has a xylose content of 55-70 wt. % based on dry solids. After crystallization, xylose is recovered as the first batch of crystalline xylose e.g. by centrifugation. The xylose yield of the first batch of crystalline xylose is typically over 35%, preferably over 45%, most preferably over 55% by weight (relative to the total weight of xylose in the feed) The yield may be in the range 30-70% and more preferable 45-65%. The xylose content of crystalline xylose after centrifugation is preferably more than 80%, more preferably more than 93% and most preferably more than 97% by weight based on dry solids. The boiling crystallization can be performed according to U.S. Pat. No. 5,951,777 and cooling crystallization can be performed e.g. according to U.S. Pat. No. 6,086,681, both of which are incorporated by reference.

After crystallization, further chromatographic separation can be conducted in respect of the first run-off to at least partially remove components other than xylose to obtain a second xylose-rich fraction. Further chromatographic separation can be performed either batch mode or continuous or sequential simulated bed mode using a strong acid cation resin in monovalent form as column filling material. Such techniques have been described e.g. in U.S. Pat. No. 4,631,129 and U.S. Pat. No. 5,637,225 which is incorporated by reference.

The components removed, or at least partially removed, in the chromatographic separation of the first run-off, may include sugars as glucose, arabinose and rhamnose, salts, ionic materials and hydroxy acids. Preferably, at least one of glucose and arabinose is removed to an extent so that the content of this component in the second xylose-rich fraction does not exceed 10 wt. % on the dry solids weight (on DS), more preferably, 5 wt. % on DS, and most preferably no more than 1 wt. % on DS of the second xylose-rich fraction. The amount of components removed will be over 40 wt. %, more preferably over 70 wt. % of amount of those components in the first run-off. The xylose content of the second xylose rich fraction is typically 50-60 wt. % based on dry solids.

The second xylose-rich fraction may be crystallized to yield a second run-off and a second batch of crystalline xylose.

The second run-off may be crystallized by precipitation to obtain a xylose enriched precipitate e.g. according to the method described in U.S. Pat. No. 5,086,681 which is incorporated by reference. This precipitate may be mixed together with the first concentrated xylose-rich solution of a subsequent batch prior to crystallization.

In the precipitation crystallization step, preferably one or more of the components galactose, mannose and rhamnose is comprised, and this component is preferably substantially eliminated in the crystallization step so that it is substantially not contained in the xylose enriched precipitate. Preferably, at least one of the above-mentioned components of the second run-off is present in the xylose enriched precipitate in an amount 1-10% on dry weight and preferably 10 wt. % or less, more preferably 5 wt. % or less, and most preferably 1 wt. % or less of the dry weight of the precipitate. The xylose content in the xylose enriched precipitate is 50-75 wt. % based on dry solids.

EXAMPLES

The present invention is further described hereinafter with reference to preferred embodiments set out in specific examples:

Example 1

Chromatographic Separation of the Spent Liquor

The test equipment included a separation column, a feed pump, a heat exchanger, inlet valves for the feed and the eluent as well as flow control means for the out-flow from the column. The height of the chromatographic resin bed in the separation column was 6.0 m and the column had a diameter of 0.111 m. The column was packed with a strong acid gel type cation exchange resin (manufactured by Finex) in $Ca^{2+}$-form. The divinylbenzene content of the resin was 5.5%. The mean bead size of the resin was 0.40 mm.

As a feed, spent liquor from $Ca^{2+}$ base sulfite cooking (CaSSL) was used and the aim was to separate the xylose contained therein.

Before the test, feed liquor was filtered with a plate & frame Seitz pressure filter using Arbocell B800 as a filtering aid (precoat 1 kg/m², bodyfeed 0.5% on DS of the feed liquor) and the feed dry substance content was adjusted to 28.4 g/100 g. The properties of the feed are set forth in the table below, whereby the percentages are given on a dry substance weight basis.

TABLE 1-I

| Composition of CaSSL Wt. % based on dry weight | |
|---|---|
| Xylose | 27.3 |
| Glucose | 1.3 |
| Other sugars | 3.3 |
| Others, | 68.1 |
| pH (as is) | 2.4 |

The feed and the eluent were used at a temperature of 65° C. and water was used as the eluent. The feed volume was 7.9 liters and the flow rate for the feed and elution was 12 l/h. Feed interval for the separation was 24.7 liters.

After equilibration of the system with several feeds, the following fractions were collected from the bottom of separation column: a residual fraction, two xylose recycle fractions (before and after the xylose fraction) and a xylose product fraction. The result including HPLC analyses for the residual fraction, combined recycle fractions and the xylose fraction are set forth in the table below.

TABLE 1-II

| | Residual | Recycle | Xylose |
|---|---|---|---|
| Volume, l | 14.0 | 3.9 | 6.8 |
| Dry solids, g/100 ml | 9.7 | 6.4 | 12.6 |
| COMPOSITION, wt. % based on dry weight | | | |
| Xylose | 1.8 | 41.2 | 65.5 |
| Glucose | 0.4 | 3.9 | 2.3 |
| Other sugars | 1.0 | 6.0 | 6.9 |
| Others | 96.8 | 48.9 | 25.3 |

The yield calculated from the product fractions was 95.8% for the xylose. The separation capacity calculated from the product fractions was 18.5 kg DS/h spent liquor per one m³ of the separation resin. The bed length:mean resin bead diameter ratio was 15000.

Example 2

Chromatographic Separation of the Spent Liquor with 7.8 m Chromatographic Resin Bed The test equipment and separation resin as described in example 1 were used, but the height of the chromatographic resin bed in the separation column was increased to 7.8 m.

As a feed, spent liquor from $Ca^{2+}$ base sulfite cooking was used and the aim was to separate the xylose contained therein.

Before the test, feed liquor was filtered with a Seitz pressure filter using Arbocell B800 as a filtering aid (precoat 1 kg/m², bodyfeed 0.5% on DS of the feed liquor) and the feed dry substance content was adjusted to 32.3 g/100 g. The properties of the feed were described in example 1.

The feed and the eluent were used at a temperature of 65° C. and water was used as the eluent. The feed volume was 10.2 liters and the flow rate for the feed and elution was 18 l/h. Feed interval for the separation was 32.3 liters.

After equilibration of the system following fractions were drawn from the separation column: residual fraction, two recycle fractions and xylose product fraction. The result including HPLC analyses for the residual fraction, combined recycle fractions and the xylose fraction are set forth in the table below.

TABLE 2

| | Residual | Recycle | Xylose |
|---|---|---|---|
| Volume, l | 18.8 | 5.8 | 7.7 |
| Dry solids, g/100 ml | 10.9 | 8.8 | 14.9 |
| COMPOSITION, wt. % based on dry weight | | | |
| Xylose, | 2.3 | 40.5 | 65.0 |
| Glucose | 0.4 | 3.2 | 2.3 |
| Other sugars | 1.3 | 5.9 | 6.8 |
| Others | 96.0 | 50.4 | 25.9 |

The yield calculated from the product fractions was 94.1% for the xylose. The separation capacity calculated from the product fractions was 23.7 kg dry solids/h spent liquor per one m³ of the separation resin. When results are compared to example 1 it can be seen that the separation capacity was increased, but xylose yield and xylose purity were lower, due to higher flow rate. The bed length:mean resin bead diameter ratio was 19500.

Example 3

Chromatographic Separation of the Spent Liquor with 9.3 m Chromatographic Resin Bed The test equipment and separation resin as described in example 1 were used, but the height of the chromatographic resin bed in the separation column was increased further to 9.3 m.

As a feed, spent liquor from $Ca^{2+}$ base sulfite cooking was used and the aim was to separate the xylose contained therein.

Before the test, feed liquor was filtered with a Seitz pressure filter using Arbocell B800 as a filtering aid (precoat 1 kg/m², bodyfeed 0.5% on DS of the feed liquor) and the feed dry substance content was adjusted to 31.8 g/100 g. The properties of the feed were described in example 1.

The feed and the eluent were used at a temperature of 65° C. and water was used as the eluent. The feed volume was 12.2 liters and the flow rate for the feed and elution was 18 l/h. Feed interval for the separation was 38.5 liters.

After equilibration of the system following fractions were collected from the separation column: residual fraction, two recycle fractions and xylose product fraction. The result including HPLC analyses for the residual fraction, combined recycle fractions and the xylose fraction are set forth in the table below.

TABLE 3

| | Residual | Recycle | Xylose |
|---|---|---|---|
| Volume, l | 22.5 | 7.2 | 8.8 |
| Dry solids, g/100 ml | 10.6 | 8.3 | 15.4 |
| COMPOSITION, wt. % based on dry weight | | | |
| Xylose | 1.5 | 44.2 | 66.6 |
| Glucose | 0.4 | 3.7 | 2.2 |
| Other sugars | 1.0 | 6.4 | 7.1 |
| Others | 97.2 | 45.7 | 24.1 |

The yield calculated from the product fractions was 96.3% for the xylose. The separation capacity calculated from the product fractions was 19.3 kg dry solids/h spent liquor per one m³ of the separation resin. When results are compared to example 1 it can be seen that separation capacity, xylose yield and xylose purity were all increased when longer chromatographic separation bed with higher flow rate was used. Also evaporation demand for the residual and xylose fractions was reduced due to higher fraction dry solids content. The bed length:mean resin bead diameter ratio was 23250.

Crystallization of xylose from the xylose fraction (xylose 66.6% on DS) was performed by boiling and cooling crystallization. The xylose fraction was evaporated to a dry solids content of 83-86 wt. % at 65° C. The resulting concentrated solution was seeded with 0.1% of powdery dry xylose and 6-hour evaporative crystallization was started at 65° C. simultaneously supplying more solution, whereby the volume, yield and crystal size of crystallization mass were increased. At the end of crystallization step the dry solids content of the mass was 87 wt. %, xylose yield 32% based on the xylose in the crystallization mass and typical crystal size 0.2-0.3 mm. The crystallization mass was transferred to a cooling crystallizer, where it was cooled to 40° C. in 25 hours, and crystals were separated from the mother liquor with a batch centrifuge. The xylose purity of the crystals was 97% on DS and the xylose yield was 63 (xylose/xylose in crystallization mass).

Example 4

Chromatographic Separation of the Spent Liquor with Lower Xylose Content

The test equipment and separation resin as described in example 1 were used, but the height of the chromatographic resin bed in the separation column was 8.0 m.

As a feed, spent liquor from $Ca^{2+}$ base sulfite cooking was used and the aim was to separate the xylose contained therein.

Before the test, feed liquor was filtered with a Seitz pressure filter using diatomaceous earth as a filtering aid (precoat 1 kg/m², bodyfeed 0.5% on DS of the feed liquor) and the feed dry substance was adjusted to 32.4 g/100 g. The properties of the feed are set forth in the table below, whereby the percentages are given on a dry substance weight basis.

TABLE 4-I

| Composition of CaSSL, % on dry weight (DS) | |
| --- | --- |
| pH (as is) | 3.3 |
| Xylose | 17.2 |
| Glucose | 2.4 |
| Other sugars | 4.2 |
| Others | 76.2 |

The feed and the eluent were used at a temperature of 65° C. and water was used as the eluent. The feed volume was 8.0 liters and the flow rate for the feed and elution was 13 l/h. Feed interval for the separation was 34.0 liters.

After equilibration of the system following fractions were drawn from the separation column: residual fraction, two recycle fractions and xylose product fraction. The result including HPLC analyses for the residual fraction, combined recycle fractions and the xylose fraction are set forth in the table below.

TABLE 4-II

| | Residual | Recycle | Xylose |
| --- | --- | --- | --- |
| Volume, l | 23.2 | 4.0 | 6.8 |
| Dry solids, g/100 ml | 8.9 | 5.7 | 10.4 |
| COMPOSITION, wt. % based on dry weight | | | |
| Xylose | 0.7 | 34.4 | 59.2 |
| Glucose | 0.9 | 8.1 | 4.9 |
| Other sugars | 1.1 | 11.3 | 11.0 |
| Others | 97.3 | 46.2 | 24.9 |

The yield calculated from the product fractions was 96.7% for the xylose. The separation capacity calculated from the product fractions was 13.2 kg dry solids/h spent liquor per one m³ of the separation resin. The bed length:mean resin bead diameter ratio was 20000.

Crystallization of xylose fraction (xylose content 59.2% based on dry solids) was carried out by cooling crystallization. The xylose fraction was evaporated to a dry solids content 83 wt. % at 65° C. Seeding of the crystallization mass with powdery xylose (0.01 wt. % based on dry solids) was made at 65° C., and linearly cooled from 65° C. to 25° C. in 60 hours and mixing with continuous agitation. The supersaturation during cooling was about 1.4. Immediately after cooling, the crystallization mass was subjected to centrifugation. The dry solids yield into crystals of crystallization mass was 37.4% and the xylose yield was 54.5% (xylose/xylose in the crystallization mass). Xylose purity in the crystals was 98.2% based on dry solids without washing.

Example 5

Chromatographic Separation of the Spent Liquor

The test equipment included a separation column, a feed pump, inlet valves for the feed and the eluent, product valves for the xylose, recycle and residual as well as flow control means for the out-flow from the column. The height of the chromatographic resin bed in the separation column was 6.2 m and the column had a diameter of 2.76 m. The column was packed with a strong acid gel type cation exchange resin (manufactured by Finex) in $Ca^{2+}$-form. The divinylbenzene content of the resin was 5.5%. The mean bead size of the resin was 0.40 mm.

As a raw material, spent liquor from $Ca^{2+}$ base sulfite cooking was used and the aim was to separate the xylose contained therein. The properties of the spent liquor are set forth in the table below, whereby the percentages are given on a dry substance weight basis.

TABLE 5-I

| Composition of CaSSL on dry solids | |
| --- | --- |
| pH (as is) | ~2.5 |
| Xylose | 24.0 |
| Glucose | 3.0 |
| Other sugars | 8.0 |
| Others | 65.0 |

Before the test, feed liquor was filtered with a Larox pressure filter using diatomaceous earth as a filtering aid (precoat 1 kg/m², bodyfeed 1.5% on DS of the feed) and the feed dry substance content was adjusted to 31.7 g/100 g with separation recycle fraction and condensate obtained from evaporation.

The feed and the eluent were used at a temperature of 65° C. and condensate obtained from evaporation was used as the eluent. The feed volume was 4900 liters and the flow rate for the feed and elution was 6800 l/h. Feed interval for the separation was 15700 liters.

After equilibration of the system following fractions were drawn from the separation column: residual fraction, two recycle fractions and xylose product fraction. The result including HPLC analyses for the residual fraction, combined recycle fractions and the xylose fraction are set forth in the table below.

TABLE 5-II

|  | Residual | Recycle | Xylose |
|---|---|---|---|
| Volume, l | 9 700 | 2 400 | 3 600 |
| Dry solids, g/100 ml | 10.7 | 8.5 | 13.6 |
| COMPOSITION, wt. % based on dry weight | | | |
| Xylose | 1.6 | 40.5 | 61.1 |
| Glucose | 0.7 | 4.3 | 3.0 |
| Other sugars | 1.0 | 6.5 | 8.0 |
| Others | 96.7 | 48.7 | 27.9 |

The yield calculated from the product fractions was 94.7% for the xylose. The separation capacity calculated from the product fractions was 18.1 kg DS/h spent liquor per one $m^3$ of the separation resin. The bed length:mean resin bead diameter ratio was 15500.

Example 6

Chromatographic Separation of the Spent Liquor

The test equipment and separation resin as described in example 5 were used, but the height of the chromatographic resin bed in the separation column was adjusted to 9.4 m.

As a raw material, spent liquor from $Ca^{2+}$ based sulfite cooking was used and the aim was to separate the xylose contained therein. The properties of the spent liquor are set forth in the table below, whereby the percentages are given on a dry substance weight basis.

TABLE 6-I

| Composition of CaSSL, wt. % based on dry weight | |
|---|---|
| Calcium | 3.0 |
| Xylose | 24.9 |
| Glucose | 1.4 |
| Other sugars | 3.5 |
| Others | 70.2 |

Before the test, feed liquor was filtered with a Larox pressure filter using diatomaceous earth as a filtering aid (precoat 1 kg/$m^2$, bodyfeed 1.5% on DS of the feed) and the feed dry substance was adjusted to 31.7 g/100 g with separation recycle fraction and condensate obtained from evaporation.

The feed and the eluent were used at a temperature of 65° C. and condensate obtained from evaporation was used as the eluent. The feed volume was 7400 liters and the flow rate for the feed and elution was 6800 l/h. Feed interval for the separation was 24500 liters.

After equilibration of the system following fractions were drawn from the separation column: residual fraction, two recycle fractions and xylose product fraction. The result including HPLC analyses for the residual fraction, combined recycle fractions and the xylose fraction are set forth in the table below.

Xylose fraction contained Calcium 0.6 wt. % on dry solids.

TABLE 6-II

|  | Residual | Recycle | Xylose |
|---|---|---|---|
| Volume, l | 15 200 | 3 700 | 5 600 |
| Dry solids, g/100 ml | 10.6 | 8.3 | 15.1 |
| COMPOSITION, wt. % based on dry weight | | | |
| Xylose | 0.9 | 40.2 | 64.7 |
| Glucose | 0.6 | 4.2 | 2.2 |
| Other sugars | 0.8 | 5.8 | 7.2 |
| Others | 97.7 | 49.8 | 25.9 |

The yield calculated from the product fractions was 97.4% for the xylose. The separation capacity calculated from the product fractions was 12.3 kg dry solids/h spent liquor per one $m^3$ of the separation resin. When results are compared to example 5 it can be seen that both xylose yield and xylose purity were increased when longer chromatographic separation bed was used.

Example 7

Chromatographic Separation of the $Mg^{2+}$ Sulfite Spent Liquor

The test equipment included a separation column, a feed pump, a heat exchanger, inlet valves for the feed and the eluent as well as flow control means for the out-flow from the column. The height of the chromatographic resin bed in the separation column was 5.2 m and the column had a diameter of 0.225 m. The column was packed with a strong acid gel type cation exchange resin (manufactured by Finex) in $Mg^{2+}$-form. The divinylbenzene content of the resin was 6.5%. The mean bead size of the resin was 0.380 mm.

As a feed, spent liquor from $Mg^{2+}$ base sulfite cooking was used and the aim was to separate the xylose contained therein.

Before the test, feed liquor was filtered with a Seitz plate and frame pressure filter using Arbocel B800 as a filtering aid (precoat 1 kg/$m^2$, bodyfeed 0.5% on DS of the feed) and the feed dry substance content was adjusted to 35.0 g/100 g. The properties of the feed are set forth in the table below, whereby the percentages are given on a dry substance weight basis.

TABLE E7-I

| Composition of MgSSL % on dry weight | |
|---|---|
| pH (as is) | 3.5 |
| Xylose | 15.8 |
| Glucose | 2.0 |
| Other sugars | 3.3 |
| Others | 78.9 |

The feed and the eluent were used at a temperature of 65° C. and water was used as the eluent. The feed volume was 19.5 liters and the flow rate for the feed and elution was 35 l/h. Feed interval for the separation was 72.9 liters.

After equilibration of the system with several feeds following fractions were drawn from the separation column product valves: residual fraction, two xylose recycle fractions (both sides of the xylose peak) and xylose product fraction. The result including HPLC analyses for the residual fraction, combined recycle fractions and the xylose fraction are set forth in the table below.

TABLE E7-II

|  | Residual | Recycle | Xylose |
|---|---|---|---|
| Volume, l | 49.0 | 11.7 | 12.3 |
| Dry solids, g/100 ml | 13.9 | 10.3 | 15.5 |
| Composition, % on dry weight | | | |
| Xylose | 2.2 | 35.1 | 53.7 |
| Glucose | 1.0 | 4.9 | 4.1 |
| Other sugars | 0.7 | 9.5 | 10.9 |
| Others | 96.1 | 50.4 | 31.4 |

The yield calculated from the product fractions was 87.1% for the xylose. The separation capacity calculated from the product fractions was 20.3 kg dry solids/h spent liquor per one m$^3$ of the separation resin. Ratio between the bed length and mean bead size of the resin was 13700.

Crystallization of xylose fraction was carried out by cooling crystallization. The xylose fraction was evaporated to a dry solids content 82% at 60° C. Seeding of the crystallization mass with powdery xylose was made at 55°, continuously agitating and linearly cooled from 55° C. to 20° C. in 60 hours. The supersaturation during cooling was about 1.15. After cooling the crystallization mass was subjected to centrifugation. The dry solids yield into crystals of crystallization mass was 26% and the xylose yield 48% (xylose/xylose in the crystallization mass). Xylose purity in the crystals was 97.3% on DS without washing.

Example 8

Chromatographic Separation of the Ca$^{2+}$ Spent Liquor with Two Column System

The test equipment was segmented bed with two separation columns, a feed pump, a heat exchanger, inlet valves for the feed and the eluent as well as flow control means for the out-flow from the column. The height of the chromatographic resin bed in the first separation column was 7.8 m and the height of the chromatographic resin bed in the second separation column was 8.2 m. The first column was equipped with a collecting device at the bottom and the second column with a distribution device at the top to ensure the undisturbed transfer of a separation profile between the columns. Both columns had a diameter of 0.111 m. The columns were packed with a strong acid gel type cation exchange resin (manufactured by Finex) in Ca$^{2+}$-form. The divinylbenzene content of the resin was 5.5%. The mean bead size of the resin was 0.40 mm.

As a feed, spent liquor from Ca$^{2+}$ base sulfite cooking was used and the aim was to separate the xylose contained therein.

Before the test, feed liquor was filtered with a Seitz plate and frame pressure filter using diatomite earth as a filtering aid (precast 1 kg/m$^2$, bodyfeed 0.5% on DS basis) and the feed dry substance content was adjusted to 31.3 g/100 g. The properties of the feed are set forth in the table below, whereby the percentages are given on a dry substance weight basis.

TABLE E8-I

| Composition of CaSSL, % on dry weight | |
|---|---|
| ph (as is) | 3.0 |
| Xylose | 27.3 |
| Glucose | 1.3 |
| Other sugars | 3.4 |
| Others | 68.0 |

The feed and the eluent were used at a temperature of 65° C. and water was used as the eluent. The fractionation was performed by way of an automatic sequence as set forth below.

Step 1: 26.5 l of feed solution was pumped into the first column at a flow rate of 18 l/h. First 2.0 l recycle fraction, then 16.5 l xylose fraction, again 4.0 l recycle fraction and finally 4.0 l residual fraction were collected from the second column.

Step 2: 19.0 l of water was pumped into the first column at a flow rate of 18 l/h and a residual fraction was collected from the same column. Simultaneously 20.0 l of water was pumped into second column at a flow rate of 19 l/h and residual fraction was collected from the same column.

Step 3: 5.0 l of water was pumped into the first column at a flow rate of 18 l/h and recycle fraction was collected from the second column.

After equilibration of the system with several feeds following fractions were drawn from the separation column product valves: residual fraction from first and second column, two recycle fractions (from both sides of xylose fraction) from the second column and xylose product fraction from the second column. The result including HPLC analyses for the combined residual fraction, combined recycle fractions and the xylose fraction are set forth in the table below.

TABLE E8-II

|  | Residual | Recycle | Xylose |
|---|---|---|---|
| Volume, l | 42.0 | 10.0 | 18.5 |
| Dry solids, g/100 ml | 12.5 | 10.5 | 17.2 |
| COMPOSITION, % on dry weight | | | |
| Xylose, | 1.3 | 49.5 | 66.1 |
| Glucose | 0.5 | 4.3 | 2.3 |
| Other sugars | 1.1 | 5.8 | 6.9 |
| Others | 97.0 | 43.4 | 24.8 |

The yield calculated from the product fractions was 96.9% for the xylose. The separation capacity calculated from the product fractions was 19.1 kg dry solids/h spent liquor per one m$^3$ of the separation resin. Ratio between the bed length and resin mean bead diameter was 40000.

Crystallization was performed in a similar way to that described in Example 3.

The invention claimed is:

1. A process for the separation of xylose from a feed liquor comprising a xylose-containing, lignosulphonate-containing Ca- or Mg-sulfite spent liquor having a xylose content of 14-27 wt. % based on dry solids, the process comprising:

(A) carrying out chromatographic separation of said feed liquor using a single pass through a long resin bed chromatography column or columns, each having a strong acid cation exchange resin as a separation medium, wherein if more than one column is utilized, the feed liquor eluted from the first column is introduced with its separation profile into the subsequent column, and wherein the strong acid cation exchange resin of each column is in the ion form of Ca$^{2+}$ or Mg$^{2+}$ of the spent liquor, and wherein the ratio of the bed length:mean resin bead diameter of the column or columns in total is 15,500-40,000, the chromatographic separation producing fractions comprising
a first xylose-rich fraction having a xylose content of 50-70 wt. % based on dry solids and
a lignosulphonate-rich fraction, and
(B) crystallizing xylose from the first xylose rich fraction by using a crystallization method comprising (i) boiling crystallization; (ii) cooling crystallization or (iii) a combination of (i) and (ii) to obtain a first batch of crystalline xylose and a first xylose run-off.

2. A process according to claim 1, wherein the resin bed chromatography column has, or if more than one column is used, each resin bed chromatography column has bed length: mean resin bead diameter ratio of 15,500-25,000.

3. A process according to claim 1 or claim 2, wherein the xylose yield of step (A) (represented by the weight of xylose in the first xylose-rich fraction relative to the weight of xylose in the Ca- or Mg-sulfite spent liquor) is over 90%.

4. A process according to claim 1 or claim 2, wherein the xylose yield of step (A) (represented by the weight of xylose in the first xylose-rich fraction relative to the weight of xylose in the Ca- or Mg-sulfite spent liquor) is 94-97%.

5. A process according to claim 1, wherein the first batch of crystalline xylose has a xylose content over 80 wt. % based on dry solids.

6. A process according to claim 1, wherein the first batch of crystalline xylose has a xylose content over 93 wt. % based on dry solids.

7. A process according to claim 1, wherein the first batch of crystalline xylose has a xylose content over 97 wt. % based on dry solids.

8. A process according to claim 1, wherein the xylose yield of steps (A) and (B) combined (represented by the weight of xylose in the first batch of crystalline xylose relative to the weight of xylose in the first xylose rich fraction) is over 35 wt. %.

9. A process according to claim 1, wherein the xylose yield of steps (A) and (B) combined (represented by the weight of xylose in the first batch of crystalline xylose relative to the weight of xylose in the first xylose rich fraction) is over 45-65 wt. %.

10. A process according to claim 1, wherein the separation parameters to be chosen are:
(i) the bed length of the column, or if more than one column is used, the bed length of each column, is in the range 5-19 m; and
(ii) the mean resin bead diameter is 0.1-1.00 mm.

11. A process according to claim 10, wherein:
(iv) the spent liquor feed volume is 5-20% of the volume of the resin bed in the column, or if more than one column is used, the volume of the resin beds of the columns in total.

12. A process according to claim 1, wherein the separation parameters to be chosen are:
(i) the bed length of the column, or if more than one column is used, the bed length of each column, is in the range 7-10 m; and
(ii) the mean resin bead diameter is 0.25-0.5 mm.

13. A process according to claim 1, wherein the separation parameters to be chosen are:
(i) the bed length of the column, or if more than one column is used, the bed length of each column, is in the range 7-10 m; and
(ii) the mean resin bead diameter is 0.32-0.42 mm.

14. A process according to claim 10, wherein:
(iii) the spent liquor feed linear flow rate is 0.5-5 m/h.

15. A process according to claim 14, wherein:
(iv) the spent liquor feed volume is 5-20% of the volume of the resin bed in the column, or if more than one column is used, the volume of the resin beds of the columns in total.

16. A process according to any one of claim 10-11 or 15, wherein:
(v) the dry solids content in the spent liquor feed is 20-55 wt. %.

17. A process according to claim 1, further comprising, subsequent to step (A) and before step (B), the following step:
(b) reducing the Ca-content of the first xylose-rich fraction to below 200 ppm based on dry solid contents by ion exchange softening and/or nanofiltration.

18. A process according to claim 17, further comprising, subsequent to step (b) and before step (B), the following step:
(c) concentrating the Ca-reduced xylose-rich fraction by evaporation to obtain a first concentrated xylose-rich solution containing more than 65 wt. % dry solids.

19. A process according to claim 1, further comprising, subsequent to step (B), the following step:
(d) carrying out chromatographic separation of the first run-off to at least partially remove components other than xylose, and thereby obtain a second xylose rich fraction.

20. A process according to claim 19, wherein the removed components in step (d) include glucose and/or arabinose, so that at least one of glucose and arabinose in the second xylose rich fraction does not exceed 10% of the dry weight.

21. A process according to claim 19 or claim 20, further comprising, after the step (d), the step of:
(e) crystallising the second concentrated xylose-rich solution using (i) cooling crystallization, (ii) boiling crystallization or (iii) a combination of both to recover a second run-off and a second batch of crystalline xylose.

22. A process according to claim 21, further comprising, after the step (e), the step of:
(f) precipitation crystallizing the second run-off to obtain a xylose enriched precipitate.

23. A process according to claim 22, wherein the xylose enriched precipitate is recycled in step (B), by mixing it with the first concentrated xylose-rich solution prior to crystallisation or recycled in step (e) by mixing it with the second concentrated xylose rich solution.

24. A process according to claim 22, wherein one or more of the components galactose, mannose, rhamnose and fucose is comprised in the second run-off, and wherein at least one of these components in the xylose enriched precipitate does not exceed 10% of the dry solids weight of the precipitate.

25. A process according to claim 1, wherein in step A, the long resin bed chromatography column, or if more than one column is used, each column, comprises a SAC-resin in the $Ca^{2+}$-ion form.

26. A process according to claim 1, wherein the xylose-containing, lignosulphonate-containing Ca- or Mg-sulfite spent liquor is derived from hardwood sulfite cooking.

* * * * *